United States Patent [19]

Riddick

[11] Patent Number: 5,015,697
[45] Date of Patent: May 14, 1991

[54] POLYBUTYLKETONES AND HYDROXYESTERS OF EPOXIDIZED POLYBUTENES

[75] Inventor: Wayne T. Riddick, Oak Park, Ill.

[73] Assignee: Amoco Corporation, Chicago, Ill.

[21] Appl. No.: 304,809

[22] Filed: Jan. 31, 1989

[51] Int. Cl.$^5$ .................. C08C 19/00; C08F 8/00; C08F 8/14; C08F 8/46

[52] U.S. Cl. .................. 525/386; 525/333.8; 560/93; 560/112; 560/200; 560/209; 560/240

[58] Field of Search .................. 525/386; 560/240

[56] References Cited

U.S. PATENT DOCUMENTS 3,155,638  11/1964  Mueller .................. 525/386
3,382,255  5/1968   White .................... 525/387

*Primary Examiner*—Earl Nielsen
*Assistant Examiner*—Frederick Krass
*Attorney, Agent, or Firm*—Gunar J. Blumberg; William H. Magidson; Ralph C. Medhurst

[57] ABSTRACT

A process is disclosed for preparing a composition comprising a polybutyl ketone and a hydroxyester of an epoxidized polybutene wherein the epoxide groups of said epoxidized polybutene are at least 70% trisubstituted. Acid compounds are reacted with epoxidized polybutenes to obtain compositions of increased reactivity as compared with polybutyl ketone compounds. These compositions are useful as chemical intermediates to modify such materials as polyesters and polyurethenes, for applications such as coatings, foams, and sealants.

3 Claims, No Drawings

POLYBUTYLKETONES AND HYDROXYESTERS OF EPOXIDIZED POLYBUTENES

FIELD OF THE INVENTION

This invention relates to polybutyl ketones and hydroxyesters of epoxidized polybutenes and to a method for their preparation. Epoxidized polybutenes have been typically found to be unreactive and previous attempts to prepare hydroxyesters of these epoxidized polybutenes to improve chemical reactivity have been unsuccessful. More particularly, the present invention relates to polybutyl ketones and hydroxyesters of epoxidized polybutenes wherein the polybutenes have been prepared in the presence of an aluminum chloride catalyst wherein the resulting polybutene has one double bond per chain and the percentage of vinylidene 1,1-disubstituted radicals present is about 10% of the total unsaturated radicals present. The unsaturated radicals comprise about 70% trisubstituted double bonds and about 20% tetrasubstituted double bonds. On epoxidation, the resulting epoxidized polybutene accordingly is relatively unreactive due to steric hindrance as compared with the reactivity of epoxidized polybutenes prepared from polybutenes prepared with other catalysts. Compositions of polybutyl ketones and hydroxyesters of epoxidized polybutenes are useful as chemical intermediates for modification of materials such as polyesters, acrylics, epoxies, and polyurethanes. Such modifications can be desirable for applications such as coatings, sealants, and foams, where properties of adhesion, flexibility, water resistance or lubricity are of importance. Polybutyl ketones and hydroxyesters of epoxidized polybutenes, including polybutyl ketones and hydroxyesters formed on direct reaction between epoxidized polybutenes and carboxyl functional polymers, are also useful without further chemical modification, for applications such as surfactants, and for applications where the hydroxyesters and polybutyl ketone are physically blended with other materials.

BACKGROUND OF THE INVENTION

The production of isobutylene polymers from mixed $C_4$ hydrocarbon feedstreams is generally known in the art. Typically, the reaction uses strong Lewis acids, i.e., titanium tetrachloride, aluminum trichloride, boron trifluoride. The resulting polyisobutylene molecule has only one functional terminal double bond. It is often preferred to utilize $AlCl_3$ as the polymerization catalyst in such processes and the prior art discloses a number of co-catalyst or catalyst promoters, including hydrogen chloride, for use under various conditions in isobutylene polymerization.

Representative disclosures include U.S. Pat. No. 2,957,930, which shows the use of 10 to 20% $AlCl_3$ catalyst in the production of polyisobutylene from a $C_1-C_5$ petroleum gas feedstock with 0.08 to 0.12 percent HCl, relative to $AlCl_3$, used as a catalyst promoter. This reference notes that correspondingly small quantities of water vapor or chloroform, which can react with $AlCl_3$ to release HCl, may also be used. British Pat. No. 1,195,760 (1970) discloses the production of olefin polymers by polymerization in the presence of the catalyst comprising a liquid complex of $AlCl_3$, HCl and an alkyl benzene. Polymerization products include materials other than polyisobutylene and products with a narrow molecular weight distribution are disclosed in this reference.

U.S. Pat. Nos. 3,200,169 and 3,200,170 deal with reaction mixture separation methods after polymerization of propylene or butylene feeds utilizing an ammonia treatment process. HCl is disclosed in the references as a suitable catalyst promoter added to the reaction zone which contains an $AlCl_3$ catalyst.

U.S. Pat. No. 3,997,129 discloses polybutenes from a $C_1-C_5$ liquified refinery stream wherein the catalyst is solid particles of $AlCl_3$ promoted with HCl gas or its equivalent. This process employs a static mixer for mixing catalysts and feed prior to conducting polymerization.

U.S. Pat. No. 3,985,822 relates to the production of poly-n-butenes by use of $AlCl_3$ promoted with HCl but the objective is to reduce the isobutylene content of the polymer product.

U.S. Pat. No. 3,119,884 discloses a series of vertical column reactors useful for polymerizing isobutylene and further discloses a catalyst system comprising $AlCl_3$ and HCl or a substance which generates HCl. The catalyst system is described as an acid promoted $AlCl_3$ catalyst. In such a system, a reaction between HCl and $AlCl_3$ occurs to form $H^+ AlCl_4^-$ which is the species that initiates polymerization. According to this process, one method of introducing catalysts and reactants is to have the three materials, i.e., $AlCl_3$, HCl and liquid feed, enter the reactor through the same duct.

It is known also to prepare epoxidized olefins polymers by the reaction of a polymer derived from an olefin containing 2 to 12 carbon atoms and a peracid. U.S. Pat. No. 3,382,255 discloses the epoxidation of polybutene in heptane to which is added a 40% peracetic acid solution. The temperature is held between 25°-30° C. by external cooling. Suitable and typical peracids useful in the epoxidation include performic, peracetic, perbenzoic, perphthalic and others. Performic and peracetic acids are preferred.

A polymer of isobutylene prepared in presence of a typical catalyst such as aluminum chloride is normally monofunctional, having a double bond at one end of the polymer chain. The olefin structure is predominantly the trisubstituted type, approximately 70%, and tetrasubstituted type, approximately 20%. Small amounts of vinylidene and terminal vinyl are present, approximately 10%. The major component of polybutenes prepared in the presence of aluminum chloride can be represented as $(CH_3)_3—C—[—CH_2—C(CH_3)_2—]—_nCR=CHCH_3$. Some internal double bonds exist but these are not easily characterized. The olefin structure results in a compound which on epoxidation is relatively unreactive to many reagents.

Surprisingly, it has been found that epoxidized polybutenes comprising a trisubstituted epoxide structure, approximately 70%, and a tetrasubstituted epoxide structure, approximately 20%, and a 1,1-disubstituted or monosubstituted epoxide structure of approximately a content of about 10% can be reacted with a carboxylic acid to form compositions of polybutyl ketone and a hydroxyester in the presence of specific acid catalysts wherein the resulting composition has increased reactivity with isocyanates, carboxyl groups, hydroxyl and thiol compounds. These specific catalysts are selected from the group including perchloric acid, fluoboric acid, and other acids with non-nucleophilic anions. Such acids are not consumed through reaction with epoxides. Lewis acids such as BF₃ etherate are also effective.

It is therefore an object of this invention to provide a process for preparing a composition of a polybutyl ketone and a hydroxyester terminated polybutene of a molecular weight of from about 200 to about 20,000.

It is another object of this invention to provide a composition of a polybutyl ketone and a hydroxyester terminated polybutene of a molecular weight of from 200 to 20,000 which can be used as a component of polyesters, polyurethanes, and other compounds useful for coatings, sealants, adhesives, and other applications.

SUMMARY OF THE INVENTION

A process is disclosed for the preparation of a composition of a polybutyl ketone and a hydroxyester terminated polybutene of molecular weight of from about 200 to 20,000 from an epoxidized polybutene. The composition of a polybutyl ketone and a hydroxyester terminated polybutene is prepared from an epoxidized polybutene composition produced from a polybutene with about 70% trisubstituted double bonds, 20% tetrasubstituted double bonds and about 10% vinylidene and terminal double bonds. The epoxidized polybutene is reacted with a carboxylic acid in the presence of an acid catalyst selected from the group consisting of fluoboric acid, boron trifluoride etherate, perchloric acid, and other acids with non-nucleophilic anions. Such acid catalysts are not consumed through reaction with epoxides. The resulting composition of a polybutyl ketone and a hydroxyester of epoxidized polybutene is useful as a chemical intermediate for modification of materials such as polyesters, acrylics, epoxies, and polyurethanes. Such modifications can be desirable for applications such as coatings, sealants, and foams, where properties of adhesion, flexibility, and water resistance are of importance.

DETAILS OF THE INVENTION

The olefin structure of the polybutene feedstock for the instant invented process for preparation of a composition of a polybutyl ketone and a hydroxyester terminated polybutene comprises about 10% vinylidene or terminal double bonds, about 70% trisubstituted double bonds and about 20% tetrasubstituted double bonds. The polybutene is epoxidized by reaction with a peracid. The epoxidized polybutene is reacted with an aliphatic or aromatic carboxylic acid of from 2 to 2,000 carbon atoms in the presence of an acid catalyst. Preferably, the epoxidized polybutene has a molecular weight within the range of from about 200 to about 20,000. More preferably, the molecular weight of epoxidized polybutenes is from about 300 to about 2300, as determined by vapor phase osmometry, and they have terminal epoxide groups which are primarily trisubstituted in nature.

Polybutenes produced in the presence of a Lewis acid such as an aluminum chloride catalyst can be considered to be mono-olefins in which the olefin or double bound structure is primarily of the trisubstituted and tetrasubstituted types. When such polybutenes are epoxidized, the resulting epoxide group is also primarily of the trisubstituted and tetrasubstituted types wherein these epoxide groups are relatively sterically hindered, especially when compared to monosubstituted epoxide groups of the well known diglycidyl ether of Bisphenol A type epoxy resins.

As a result of this steric hindrance, these epoxide groups are much less reactive than more typical, less sterically hindered epoxide groups. Also as a result of the steric environment, these epoxide groups, when forced to react by use of certain acid catalysts, tend to rearrange to ketones instead of undergoing the desired nucleophilic substitution reaction. The resulting polybutyl ketones typically react readily with amines but have limited reactivity with other compounds such as isocyanates or those containing carboxyl groups, hydroxyl groups and thiol groups. The instant invented process provides a polybutyl ketone mixed with a polybutene hydroxyester wherein the mixture has increased reactivity.

It is essential that a suitable catalyst be used in the process of this invention. Without the aid of a suitable catalyst, epoxidized polybutenes which are at least 70% trisubstituted do not react well with carboxylic acids, either at ambient temperatures or temperatures as high as 180°-200° C. Commonly used acid catalysts such as sulfuric acid and p-toluenesulfonic acid are not very effective in promoting the esterification of these epoxidized polybutenes with carboxylic acids, even at temperatures as high as 180°-200° C.

Basic catalysts such as N,N-dimethylbenzylamine and sodium carbonate are also ineffective. To the extent that base-catalyzed reactions go forward, however, base catalysis appears more effective than acid catalysis (sulfuric and p-toluenesulfonic acids) in producing the desired hydroxyester as opposed to undesired by-products. But extent of reaction under base catalysis is low, very likely due to steric hindrance of the epoxide.

Acids such as fluoboric acid, boron trifluoride etherate, and perchloric acid are very effective in catalyzing the reaction of most or all of the epoxide of the epoxidized polybutene. Depending on reaction conditions, polybutyl ketone can be a greater or lesser product. The ketone product is produced not only from the initial epoxide reaction, but also upon subsequent degeneration of the co-produced hydroxyester product. Both routes to ketone production appear to be acid catalyzed.

In general, the instant invented process is as follows:

a. The molar ratio of carboxylic acid to epoxidized polybutene should be at least 1/1, and preferably greater than 8/1. It is believed that a relatively large excess of carboxyl helps increase the formation of the hydroxyester.

b. In cases where the epoxidized polybutene and carboxylic acid are not mutually soluble, a suitable solvent should be used, able to dissolve both the epoxidized polybutene and the carboxylic acid. Methylene chloride and tetrahydrofuran are examples of solvents able to dissolve the epoxidized polybutene and often able to also dissolve the carboxylic acid.

c. Acid catalysts suitable for catalyzing the esterification reaction are those not so nucleophilic that they are consumed through reaction with the epoxide. Examples are fluoboric acid, perchloric acid, and boron trifluoride etherate.

d. Catalyst levels should be between 0.2 and 15 mole percent, based on epoxidized polybutene. Preferred levels are between 0.5 and 10 percent. It is considered that moderate catalyst levels increase hydroxyester formation.

e. Reaction temperatures should be between −20° and 70° C., preferably between −10° and 40° C. It is considered that moderate temperatures, in the area of 25° C. or below, increase hydroxyester formation.

f. Carboxylic acids suitable for this invention include aliphatic and aromatic mono- and polyfunctional carboxylic acids such as acetic, propanoic, butanoic, pentanoic, benzoic, isophthalic, terephthalic, adipic, acrylic, and phthalic acids. Also suitable are carboxyl functional polymers including acrylics and polyesters.

g. Suitable epoxidized polybutenes are those produced by epoxidation of polybutenes polymerized with aluminum chloride catalyst. Such polybutenes have molecular weights ranging from about 300 to about 2300, and they have terminal double bonds which are primarily trisubstituted in nature. They are typically epoxidized with some type of peracid.

The following examples illustrate the process of the instant invention but are not to be construed as limiting the scope of this invention.

EXAMPLE I

An 8.3/1 molar ratio of glacial acetic acid/epoxidized polybutene was added to a flask which used a thermometer, a nitrogen blanket, an agitator, and a water-cooled total condenser. Methylene chloride solvent was used. The epoxidized polybutene had a number-average molecular weight of 365.

With the flask contents at room temperature, 0.5 mole percent fluoboric acid based on epoxidized polybutene was added under agitation. The mixture immediately turned a darker shade of yellow and exothermed about 2° C. The mixture continued to be agitated at room temperature for a total of seven hours after the initial catalyst was added, and during that period, an additional 0.5 mole percent fluoboric acid was added both at two hours and four hours into the reaction. The mixture exothermed 2° C. and further changed color upon each of these additional catalyst additions. Samples were taken from the mixture for analysis at approximately 5 minutes, 1, 2, 4, and 7 hours into the reaction.

By $^{13}$C NMR, the product after four hours of reaction contained about 62% polybutyl ketone, with the remainder, about 38%, being the hydroxyester. The product mixture did not change in composition after 4 hours of reaction.

EXAMPLE II

The following example illustrates that use of certain acids, such as ferric chloride, as catalyst, results in a product comprising mainly polybutene ketone and not the desired composition of hydroxyester and polybutyl ketone.

In flasks equipped with a thermometer, a nitrogen blanket, an agitator, and a water-cooled total condenser, two reactions with identical formulations but different procedures were carried out. Both reactions involved an 8.3/1 molar ratio of glacial acetic acid/epoxidized polybutene. The epoxidized polybutene had a number-average molecular weight of 365. Methylene chloride solvent was used in both reactions, and ferric chloride catalyst was used as a catalyst in both reactions, at a level of 4 mole % based on epoxidized polybutene. In one case, the ferric chloride catalyst was added to a pre-mixed mixture of epoxidized polybutene, acetic acid, and methylene chloride. The reaction was carried out at room temperature, and samples were pulled at 1, 3, and 4 hours after catalyst addition. In the second case, acetic acid, methylene chloride, and ferric chloride catalyst were pre-mixed for 15 minutes prior to addition of epoxidized polybutene. The reaction was carried out at room temperature, and samples were pulled at 1, 2, and 4 hours. Samples were worked up with aqueous sodium bicarbonate solution for removal of unreacted acetic acid. In both cases, a large exotherm of about 35° C. occurred immediately upon contact of the epoxidized polybutene with ferric chloride, and in both cases, IR analysis pointed to quick conversion of the epoxidized polybutene to a product consisting mainly of polybutyl ketone.

EXAMPLE III

The following illustrates that epoxidized polybutenes comprising about 70% trisubstituted epoxide and about 20% tetrasubstituted epoxide are relatively unreactive and do not react with n-dodecylamine. 730 g epoxidized polybutene, average molecular weight 365, was added to a flask containing 185 g n-dodecyclamine, (98%) with agitation. The mixture was heated to a temperature within the range of 150°-200° C. for 6 hours. There was no discernible evidence of any reaction by infrared analysis.

The procedure was repeated with 183 g epoxidized polybutene, 185 g n-dodecylamine, (98%) and 3.7 g N,N-dimethylbenzylamine as catalyst. The mixture was agitated and heated to a temperature of from to 150° C. to 210° C. for 7 hours. There was no discernible evidence of any reaction by infrared analysis.

EXAMPLE IV

The following indicates the typical lack of reactivity of epoxidized polybutene wherein the polybutene is prepared with aluminum chloride catalyst. Attempts were made to react these epoxides, either to polymerize them in the presence of a strong acid or to react the epoxide with amines, thiol compounds or sodium hydroxide. In all cases there was either no reaction or, sometimes, a ketone was formed.

Tetraethylenepentamine (TEPA) and epoxidized polybutene of molecular weight 365 in a solution of tetrahydrofuran (THF) in the presence of water as a catalyst was refluxed overnight. There was no discernible reaction.

In a similar procedure normal dodecanethiol was refluxed overnight in THF solvent with the epoxidized polybutene. There was no reaction. The procedure was repeated in the presence of 0.10N sodium hydroxide. Again, there was no reaction.

The reaction of TEPA with polybutene epoxide was also conducted in refluxing THF using 0.10N sulfuric acid as a catalyst and again no reaction of the epoxide with the TEPA was observed.

What is claimed is:

1. A process for preparing compositions comprising polybutyl ketones and hydroxyesters of epoxidized polybutenes wherein the epoxide group of said epoxidized polybutene is about 70% trisubstituted and about 20% tetra-substituted, wherein said epoxidized polybutene has been prepared from a polybutene having only one functional terminal double bond in an olefin structure about 70% trisubstituted and about 20% tetrasubstituted, wherein molecular weight of polybutene portion of said epoxidized polybutene is from about 200 to 20,000, which process comprises reacting an aliphatic or aromatic carboxylic acid of from 2 to 2,000 carbon atoms with said epoxidized polybutene in the presence of an acid catalyst with non-nucleophilic anions which does not react with said epoxide group, wherein molar ratio of said aliphatic or aromatic carboxylic acid to said epoxidized polybutene is at least about 1:1 at a temperature within the range of from about −20° C. to about 70° C., and said acid catalyst is present in an amount within the range of from about 0.2 to 15 mole % of said epoxidized polybutene.

2. The process of claim 1 wherein said acid catalyst is selected from the group consisting of fluoboric acid, boron trifluoride etherate and perchloric acid.

3. The process of claim 1 wherein said carboxylic acid is acetic acid.

* * * * *

UNITED STATES PATENT AND TRADEMARK OFFICE
CERTIFICATE OF CORRECTION

PATENT NO. : 5,015,697
DATED : May 14, 1991
INVENTOR(S) : Wayne T. Riddick

It is certified that error appears in the above-indentified patent and that said Letters Patent is hereby corrected as shown below:

| Col. | Line | |
|---|---|---|
| 2 | 47 | "vinylidene and terminal" should read --vinylidene ($R-CH_2-CR=CH_2$) and terminal-- |
| 2 | 47 | "terminal vinyl are present" should read --terminal vinyl ($R-CH=CH_2$) are present-- |

Signed and Sealed this

Seventeenth Day of January, 1995

Attest:

BRUCE LEHMAN

*Attesting Officer*      *Commissioner of Patents and Trademarks*